(12) United States Patent
Sorum (10) Patent No.: US 8,864,407 B1
(45) Date of Patent: Oct. 21, 2014

(54) LOCKING JOINT FOR JOINING STRUCTURAL MEMBERS

(76) Inventor: Petter Sorum, Fairfield, CT (US)

( * ) Notice: Subject to any disclaimer, the term of this patent is extended or adjusted under 35 U.S.C. 154(b) by 888 days.

(21) Appl. No.: 13/050,322

(22) Filed: Mar. 17, 2011

(51) Int. Cl.
*F16B 7/00* (2006.01)

(52) U.S. Cl.
USPC ............ 403/381; 403/231; 403/382; 211/187

(58) Field of Classification Search
CPC .......... F16B 12/02; F16B 12/10; F16B 12/12; F16B 12/125
USPC ......... 403/241, 245, 246, 263, 360, 375, 381, 403/382, 383; 52/590.1, 590.2, 590.3, 52/592.4, 592.5, 292.2, 292.3, 292.6; 211/103, 190; 108/109, 110, 147.17, 108/158.12, 108; 248/223.41
See application file for complete search history.

(56) References Cited

U.S. PATENT DOCUMENTS

| | | | |
|---|---|---|---|
| 1,032,674 A | 7/1912 | Holland | |
| 1,534,468 A * | 4/1925 | Shea, Jr. | 403/382 |
| 2,710,053 A | 6/1955 | Hamilton | |
| 3,216,539 A | 11/1965 | Piget | |
| 3,347,574 A | 10/1967 | Strubin | |
| 3,664,011 A * | 5/1972 | Labastrou | 144/347 |
| 3,966,337 A | 6/1976 | Crawford | |
| 3,986,316 A | 10/1976 | Blodee | |
| 4,984,929 A | 1/1991 | Rock et al. | |
| 5,180,250 A * | 1/1993 | Ferro | 403/252 |
| 5,899,251 A * | 5/1999 | Turner | 144/347 |
| 6,045,290 A * | 4/2000 | Nocievski | 403/231 |
| 6,363,643 B1 * | 4/2002 | Padiak et al. | 40/606.14 |
| 6,413,007 B1 | 7/2002 | Lambright | |
| 6,547,086 B1 * | 4/2003 | Harvey | 211/87.01 |
| 6,584,747 B2 | 7/2003 | Kettler et al. | |
| 7,086,542 B2 * | 8/2006 | Tomonari et al. | 211/94.01 |
| 7,150,135 B2 | 12/2006 | Becker | |
| 7,603,826 B1 * | 10/2009 | Moebus | 52/592.1 |
| 7,641,414 B1 | 1/2010 | Joyce | |
| 7,841,144 B2 * | 11/2010 | Pervan | 52/395 |
| 8,074,418 B2 * | 12/2011 | Thiagarajan et al. | 52/590.1 |
| 2002/0122691 A1 * | 9/2002 | Wood | 403/381 |
| 2006/0273085 A1 * | 12/2006 | Casto | 220/62 |

\* cited by examiner

*Primary Examiner* — Daniel P Stodola
*Assistant Examiner* — Matthew R McMahon
(74) *Attorney, Agent, or Firm* — Goldstein Law Offices, P.C.

(57) ABSTRACT

A furniture interconnection system for reversibly joining a board element and an upright element perpendicular to each other in a furniture frame. The joint is formed by a tenon and a mortise, the tenon having a novel irregular hexagon shape, the mortise having a novel irregular quadrilateral shape. The tenon is inserted into the mortise and pivoted in stages on a pair of angles of the hexagon, to form a stable joint without fasteners such as glue, screws, and other similar fasteners. As the tenon pivots inside the mortise, pairs of complementary and supplementary angles interact within the furniture interconnection system to position the tenon to form the stable joint without additional fasteners, allowing the furniture frame to be easily dismantled for moving or reconfiguration without damaging the frame, but forming the reversible joint that is sufficiently sturdy to support the load it was designed to bear.

7 Claims, 8 Drawing Sheets

LOCKING JOINT FOR JOINING STRUCTURAL MEMBERS

BACKGROUND OF THE INVENTION

The invention relates generally to a system for interconnecting structural members. More particularly, the invention relates to a system particularly well suited for joining structural members involved in the construction of furniture, such as by interconnecting a first furniture frame element perpendicular to a second furniture frame element with an interlocking joint formed by a substantially hexagonal tenon that inserts into a quadrilateral mortise and pivots into a locked position. The invention is also suitable for interconnecting structural frames for various types of buildings and similar purposes.

Many types of home furniture are constructed by joining a horizontal frame segment to a vertical frame segment, especially when the two segments are orthogonal to each other. There are many examples of this type of structure, such as shelving, drawers, bed frames, chair rails and stretchers, and cabinetry in general. Furniture makers form these joints by inserting an end on the horizontal segment into a channel on the orthogonal vertical segment. When the joint is a permanent connection, the furniture makers reinforce the joint with glue or other attachments means such as nails. When the joint is meant to be nonpermanent, such as when assembling a bed frame, the furniture manufacturer must rely on a joint that locks together, forming a structurally strong joint, but can allow the furniture to be disassembled. Traditionally, these joints are formed by a tenon and mortise, similar to the tongue and groove used when joining segments that are in the same plane, not orthogonal. In these systems, one segment has a least one female opening and the joining piece has a male piece that is inserted into the opening.

Many different structures for forming a joint using a tenon and mortise or tongue and groove have been proposed. Many shapes have been created for the tenon or tongue, including a beveled hook, a diamond, a square, and a beveled parallelogram. Some have an additional locking rib to catch onto a side of the groove or mortise. Similarly, many shapes to accommodate the mated tenon or tongue have been proposed for the mortise or groove. In addition to square, rectangular, parallelogram, triangular, and elliptical shaped grooves and mortises, a compound orthogonal channel in the shape of a cross has been designed for receiving a tenon or tongue. Others have proposed additional hardware to support the joint such as caps or hooks.

While these units may be suitable for the particular purpose employed, or for general use, they would not be as suitable for the purposes of the present invention as disclosed hereafter.

SUMMARY OF THE INVENTION

It is object of the invention to produce a system for joining structural members. More particularly, a system is described suitable for use in assembling a furniture frame having a joint that is stable without a fastener. Accordingly, a furniture interconnection system has joint formed by a tenon and a mortise, the tenon stably locked inside the mortise, fixed without additional fasteners.

It is a further object of the invention to produce a furniture interconnection system for assembling a furniture frame having a joint that dismantles easily. Accordingly, the furniture interconnection system has a joint stably fixed without fasteners so that the joint dismantles easily without removing any fasteners.

The invention is a furniture interconnection system for reversibly joining a board element and an upright element perpendicular to each other in a furniture frame. The joint is formed by a tenon and a mortise, the tenon having a novel irregular hexagon shape, the mortise having a novel irregular quadrilateral shape. The tenon is inserted into the mortise and pivoted in stages on a pair of angles of the hexagon, to form a stable joint without fasteners such as glue, screws, and other similar fasteners. As the tenon pivots inside the mortise, pairs of complementary and supplementary angles interact within the furniture interconnection system to position the tenon to form the stable joint without additional fasteners, allowing the furniture frame to be easily dismantled for moving or reconfiguration without damaging the frame, but forming the reversible joint that is sufficiently sturdy to support the load it was designed to bear.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
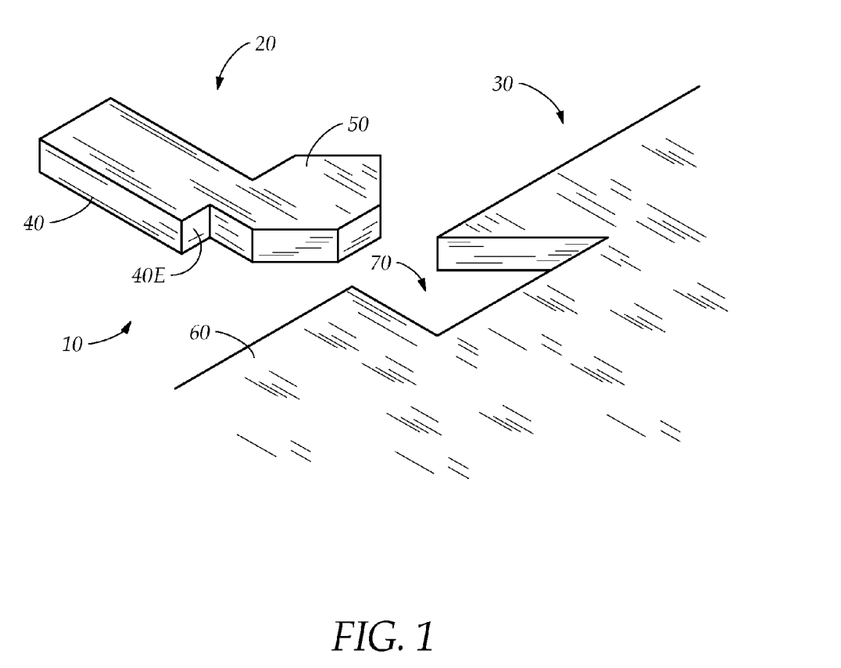
FIG. 1 is a diagrammatic perspective view of the furniture interconnection system from the side showing an upright element and a board element.

The invention relates to a system for joining structural members. In particular, FIG. 1 illustrates a furniture interconnection system 10 for use when assembling a furniture frame having a joint formed by a pair of elements perpendicular to each other. The furniture interconnection system 10 has a horizontal board element 20 and a vertical upright element 30. The board element 20 has a rectangular rail 40 having at least one end 40E having a tenon 50. The upright element 30 has a post 60, the post 60 having an opening forming a mortise 70. The tenon 50 has a novel shape in the form of an irregular hexagon. The mortise 70 has a novel shape in the form of an irregular quadrilateral. The tenon 50 is inserted into the mortise 70 and pivoted in stages to form a stable joint without addition fasteners such as glue, screws, and other similar fasteners, the joint supporting weight in three directions, vertically and horizontally in two opposing directions orthogonal to the joint. As the tenon 50 pivots inside the mortise 70, pairs of complementary and supplementary angles interact within the furniture interconnection system 10 to position the tenon 50 to form the stable joint. The advantage of such a stable joint without fasteners allows the furniture frame to be easily disassembled for moving or reconfiguration without damaging the frame, but yet the joint formed by the furniture interconnection system 10 is sufficiently sturdy to support the load it was designed to bear.

Figure 2:
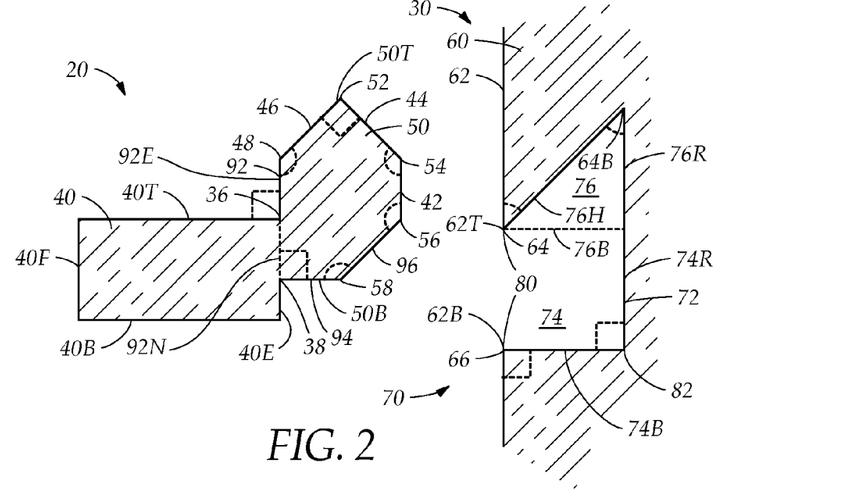
FIG. 2 is a side elevational view of the furniture interconnection system with the upright element and the board element separate.

FIG. 2 illustrates two-dimensionally the novel shape of the tenon 50 on the end 40E of the rail 40. The tenon 50 is an irregular hexagon attached to the rectangular rail 40, the rail 40 having a top edge 40T, a bottom edge 40B and a pair of side edges 40E, 40F that intersect to form right angles. The tenon 50 has six internal angles and six sides, five sides 42, 44, 46, 94, 96 having external edges adjacent to each other and a side 92 having an external edge segment 92E that continues into an internal edge segment 92N abutting and joining to the end of the rail 40. The tenon 50 has a top peak 50T having an angle 52 and a bottom 50B having a side edge 94, the peak 50T forming a right angle with the adjacent side edges 44, 46. The internal side edge segment 92N abutting the rail end 40E forms a right angle with the bottom side 94. The four remaining angles 48, 54, 56, 58 at the intersection of the sides are approximately one hundred thirty-five degrees, such that the sum of the angles of the irregular hexagon is seven hundred twenty degrees. All angles of the tenon are integer multiples of forty-five degrees, either approximately ninety degrees, which is twice forty-five degrees, or one hundred thirty-five degrees, which is three times forty-five degrees. For the purpose of this discussion, the tenon 50 and rail 40 are explained as separate members, but one of ordinary skill understands that the tenon 50 and rail 40 can be cut from a continuous piece of material thus making the board element 20 one continuous piece of material. It is understood by those of ordinary skill that angles are described as approximate due to the variation in precision of the manufacturing process.

FIG. 2 also illustrates two-dimensionally the novel shape of the mortise 70 in the post of the upright element 30. The mortise 70 is a cavity cut into the post 60 to receive the tenon 50, having a front opening 80 and a back 72. The mortise 70 of the invention is a wedged half-dovetail in which the rear 72 is taller than the front opening 80. The mortise consists of two portions, a square bottom portion 74 having a closed rear side 74R and a closed bottom side forming a right angle, angle 82, and a top isosceles right triangle portion 76, having a pair of identical side legs 76B, 76R and a hypotenuse 76H, a first side leg 76B of the triangle abutting the bottom portion 74 and a second closed rear side leg 76R continuous with the closed rear side 74R of the square bottom portion 74. For the purpose of this discussion, the two portions are being described as separate portions, but it is understood by those of ordinary skill that two portions form one continuous cavity of the mortise 70.

The post 60 has a front edge 62 having the opening of the mortise, the front edge separated into a top front edge 62T and a bottom front edge 62B by the opening of the mortise 80. The hypotenuse 76H of the top portion 76 of the mortise 70 forms an acute angle, angle 64A, of approximately forty-five degrees with the top front edge 62T of the post. The hypotenuse 76H of the top portion 76 forms an acute angle, angle 64B, of approximately forty-five degrees with the closed rear leg 76R of the top portion 76. The closed bottom side 74B of the mortise 70 forms a right angle 66 with the bottom front edge 62B of the post 60. All angles of the mortise are integer multiples of forty-five degrees, either approximately forty-five degrees, or approximately ninety degrees, which is twice forty-five degrees, so that the angles of the tenon 40 are either complementary or supplementary to the angles of the mortise 70 and post 60. The closed back side 74R of the bottom portion 74 and the second rear side leg 76R of the top portion 76 form the back 72 of the mortise 70 that is continuous and taller than the front opening 80.

FIG. 3 through FIG. 9 show how the tenon 50 is inserted into the mortise 70 and pivoted to form the joint in the furniture interconnection system 10. The board element is initially rotated ninety degrees clockwise, the board element 30 almost parallel to the upright element 20, the tenon 50 is inserted, pivoted twice counterclockwise, each time about forty-five degrees until the board element 30 returns to the original position, perpendicular to the upright element 20. It should be noted that the illustrations show a truncated rail 40 to efficiently represent the invention in the drawing, but it is understood that the length of the rail 40 is immaterial to the function of the joint formed in the furniture interconnection system 10 and longer rails are envisioned in the system, generally having at least a first tenon 50 on the first end 40E and optionally a second tenon on a second end. It is further understood that the drawings show the board element 20 to the left of the upright element 30 and that directions for pivoting the board element 20 will be discussed using that orientation and those of ordinary skill understand that when the board element 20 is to the right of the upright element 30, the directions are a mirror image of the directions presented hereinbelow. Generally, when the tenon is inserted and pivoted, the upright element remains stationary and the board element rotates in a counterclockwise direction, pivoting the tenon in the mortise. It is understood by those of ordinary skill that rotating the upright element in a clockwise direction while holding the board element stationary achieves the same result.

For the purposes of this discussion, each side and each angle of the tenon are named. A next angle in a clockwise direction from the top peak right angle 52 is an angle two 54, the next angle in a clockwise direction following the angle two 54 is an angle three 56 and the next angle in a clockwise angle following the angle three 56 is an angle four 58. In a counterclockwise direction from the top peak right angle is an angle six 48. Angle two 54, angle three 56, angle four 58 and angle six 48 are approximately one hundred thirty-five degrees. An angle formed by the bottom side 94 and the internal side edge 92N abutting the rail end 40E is an angle five 38, which is a right angle. A side one 44 is between the top peak angle 52 and angle two 54, a side two 42 is between angle two 54 and angle three 56, a side three 96 is between angle three 56 and angle four 58, a side six 46 is between the top peak angle 52 and angle six 48. A side five 92, having an external edge segment 92E, starting at angle six 48 that continues to the top edge 40T of the rail, forming a right angle with the top edge of the rail, the right angle is an angle seven 36. Side five 92 also has an internal edge segment 92N abutting the end of the rail 40E.

Figure 3:
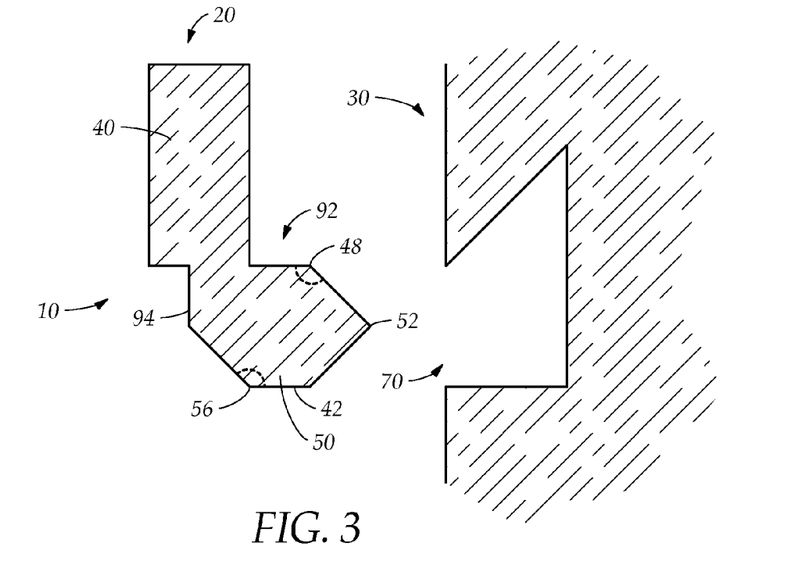
FIG. 3 is a side elevational view of the furniture interconnection system with the board element turning such that a tenon on the board element has rotated ninety degrees.

In FIG. 3, the board element 20 is rotated ninety degrees in a clockwise direction, and the tenon 50 is aligned with the mortise opening 70 in the post 30. The tenon 50 has a horizontal width defined by the distance between side two 42 and side five 92. The tenon 50 has a diagonal diameter defined as the distance between angle three 56 and angle six 48. The tenon 50 has a length defined by the top peak 52 of the tenon 50 to the bottom side 94.

Figure 4:
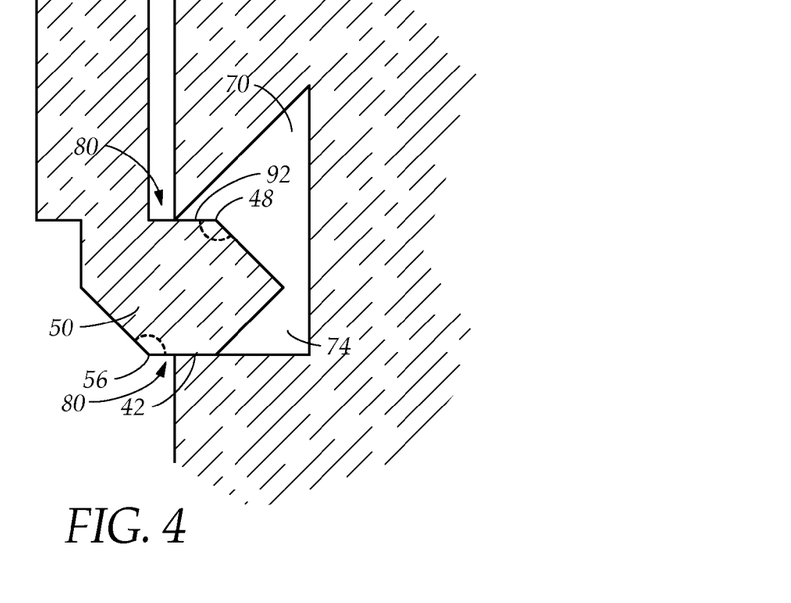
FIG. 4 is a side elevational view of the furniture interconnection system with the tenon on the board element inserted into a mortise on the upright element.

FIG. 4 demonstrates the initial insertion of the tenon 50 into the square bottom portion 74 of the mortise 70. The opening 80 of the mortise 70 is sufficient that the horizontal width of the tenon defined by the distance between side two 42 and side five 92 snugly fits through the opening 80. The diagonal diameter, defined as the distance between angle three 56 and angle six 48 and slightly larger than the tenon width and mortise opening 80 passes into the mortise 70 at an angle.

Figure 5:
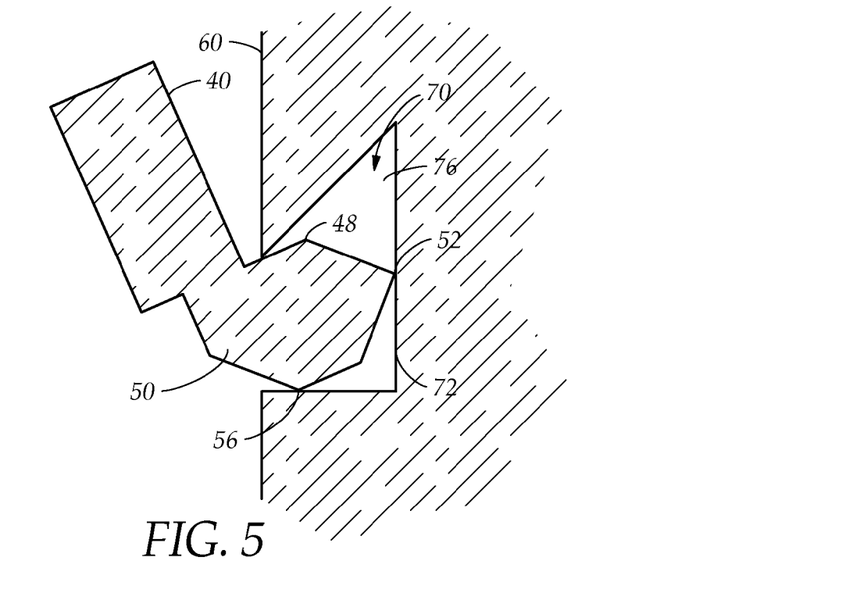
FIG. 5 is a side elevational view of the furniture interconnection system with the tenon rotating within the mortise.

FIG. 5 shows initiation of a first pivot at angle three 56 after initial insertion of the tenon 50 in the counterclockwise direction, the rail 40 at approximately a thirty-degree angle to the post. The peak 52 of the tenon 50 abuts the back 72 of the mortise 70. The mortise 70 has sufficient space for the diagonal diameter to rotate, pivoting on angle three 56 as angle six 48, defining the diagonal diameter enters the triangle portion 76 of the mortise 70.

Figure 6:
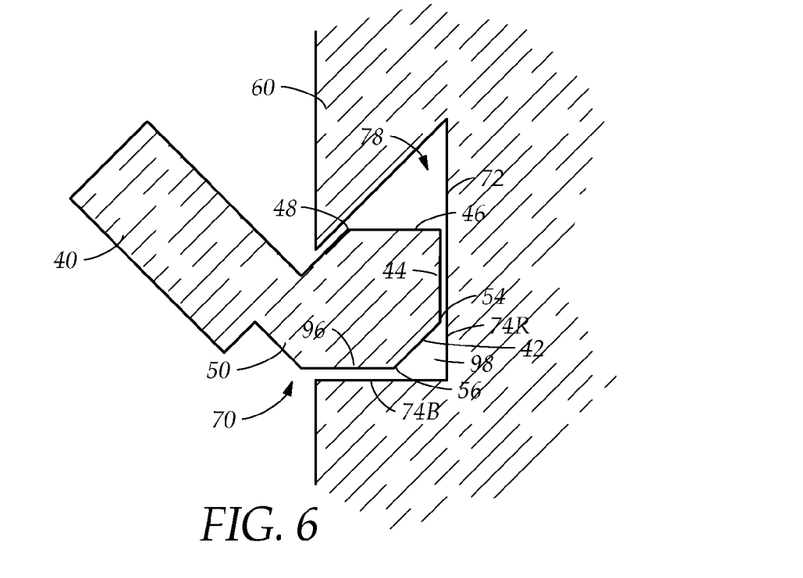
FIG. 6 is a side elevational view of the furniture interconnection system with the tenon rotating within a peak in the mortise.

FIG. 6 shows completion of the first pivot of the inserted tenon 50 in the counterclockwise direction, the rail 40 now at approximately a forty-five degree angle to the post 60. Side one 44 approaches the mortise back 72, side three 96 is parallel to the bottom side 74B of the mortise 70. The tenon 50 begins to occupy the top triangle portion 76, side six 46 penetrating the triangle portion 76. Side six 46 shortens the hypotenuse 76H of the triangle portion 76, outlining a smaller isosceles right triangle 78, angle six 48 the supplementary angle for the forty-five degree angle of an isosceles right triangle. A still smaller isosceles right triangle 98 is outlined by side two 42 with the bottom side 74B and the closed rear side 74R of the bottom portion of the mortise 70, angle two 54, and angle three 56 of the tenon 50 forming supplementary angles for the forty-five degree angles of an isosceles right triangle 98. The tenon 50 is not snug in the mortise 70, allowing further room to pivot.

Figure 7:
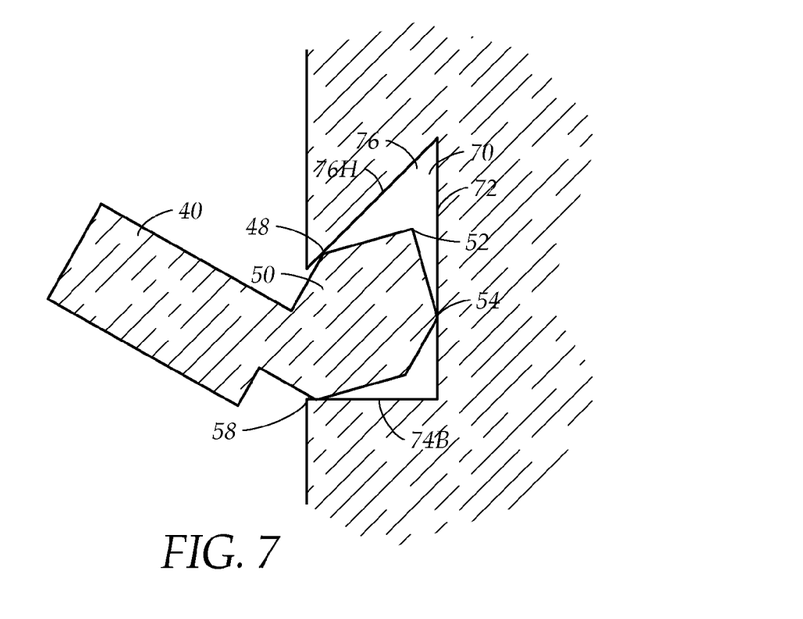
FIG. 7 is a side elevational view of the furniture interconnection system with the tenon further rotating within the peak in the mortise.

FIG. 7 shows initiation of a second pivot of the inserted tenon 50 with the rail 40 in the counterclockwise direction. The tenon 50 pivots on angle four 58 at the closed bottom side 74B of the mortise, angle six 48 pivoting on the hypotenuse 76H of the triangle portion 76 of the mortise 70 and the top peak angle 52 moves into the triangle portion 76 of the mortise 70. Angle two 54 abuts the back of the mortise.

Figure 8:
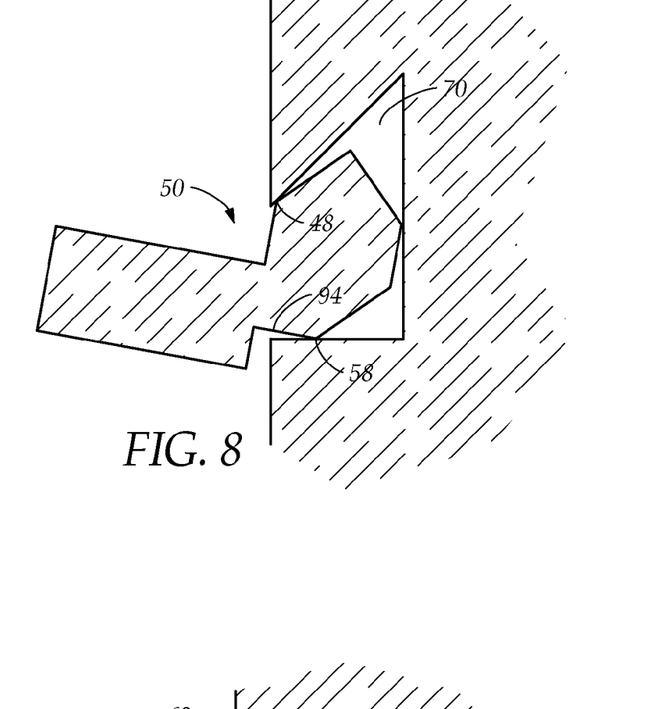
FIG. 8 is a side elevational view of the furniture interconnection system with the tenon inserted within the peak in the mortise.

FIG. 8 shows a continuation of the second pivot of the inserted tenon 50 in the counterclockwise direction. The tenon 50 continues to pivot on angle four 58 and angle six 48 as the bottom side 94 of the tenon 50 approaches the closed bottom side 74B of the mortise 70.

Figure 9:
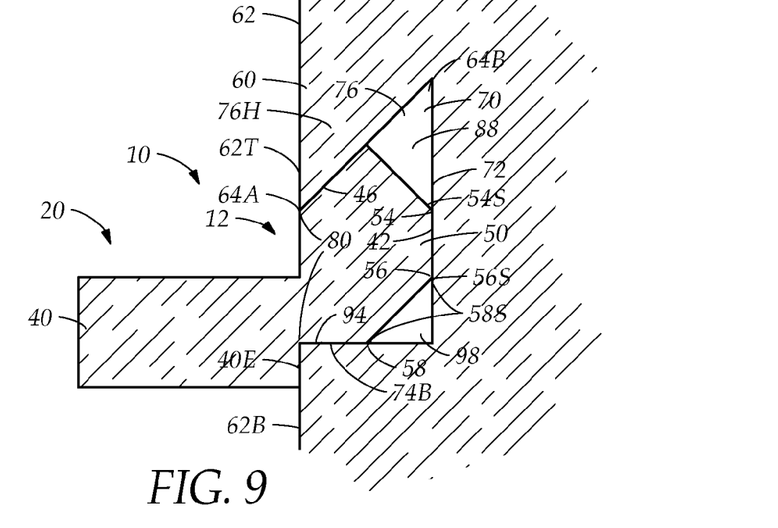
FIG. 9 is a side elevational view of the furniture interconnection system with the tenon fully inserted in the mortise and locked.

FIG. 9 shows the tenon in the final position, forming the joint 12 of the furniture interconnection system 10. The rail 40 is fully rotated, having rotated about a full ninety degrees, the end of the rail 40E snugly abutting the bottom front edge 62B of the post 60, preventing further rotation in the counterclockwise direction. The bottom side 94 of the tenon 50 abuts the bottom side 74B of the mortise 70. Side two 42 of the tenon 50 abuts the back of the mortise, and side six 46 abuts the hypotenuse 76H of the triangle portion 76 of the mortise 70. In this position, side two 42 and the end 40E of the rail 40 abutting the bottom front edge 62B of the post 60 prevents further rotation in a counterclockwise direction. The maximum depth of the mortise 70 from the front edge 62 of the post 60 to the rear 72 of the mortise 70 is the same dimension as the opening 80, so that horizontal width of the tenon between side five 92 and side two 42 snugly fits between the angle 64A formed by the hypotenuse and the top front edge 62T of the post 60 and the back 72 of the mortise 70 in the same manner as the tenon 50 fits through the opening during the initial insertion. The length of the tenon 50 between the top peak angle 52 and the bottom side 94 is parallel to the rear 72 and the opening 80, the length of the tenon 50 being greater than the opening 80, so that the tenon 50 cannot be pulled outward.

FIG. 9 further shows the tenon 50 creating a pair of smaller isosceles right triangles inside the mortise 70 when the tenon 50 is interlocked into the mortise 70, a first bottom triangle 98 formed by a pair of acute angles, a first angle supplementary 56S to angle three 56 of the tenon and a second angle supplementary 58S to angle four 58 of the tenon 50, and a second top triangle 88 formed by the top acute angle 64B of the mortise 70 and an angle 54S supplementary to angle two 54 of the tenon 70.

Figure 10:
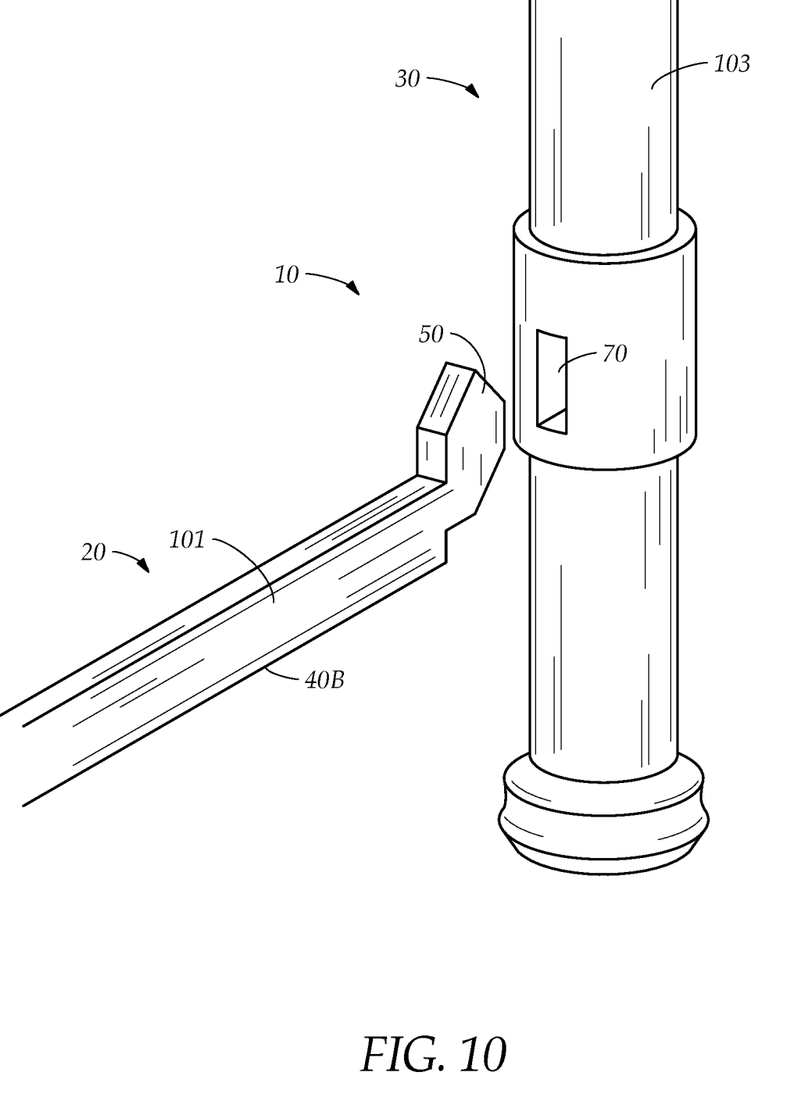
FIG. 10 is a diagrammatic perspective view of the furniture interconnection system from the front showing a bed railing with the tenon of the system and a bedpost with the mortise of the system.

FIG. 10 shows an example of the furniture interconnection system 10 where the board element 20 is a bed railing 101 and the upright element is a bedpost 103. It should be noted that the post can be any ornamental shape as long as it can accommodate the mortise 70 as described hereinabove. It should also be noted that the bed railing 101 can have additional features such as a ledge attached to the bottom 40E of the rail without interfering with the function of the tenon 50.

Figure 11:
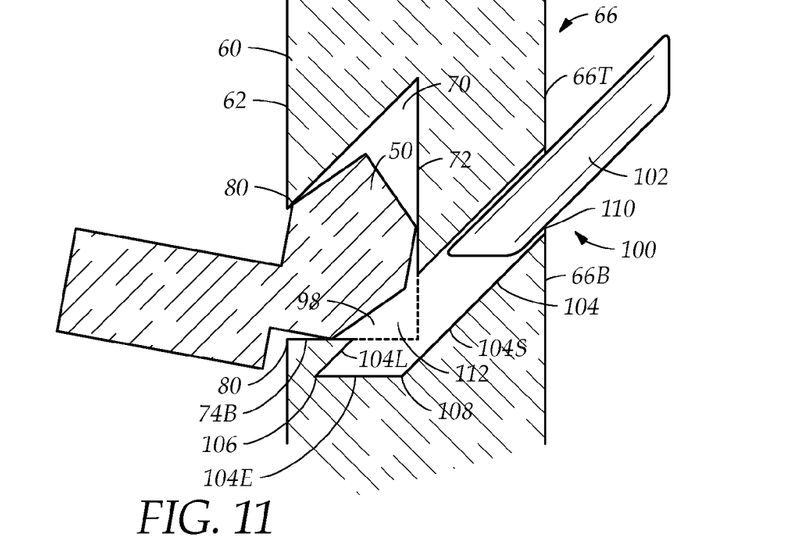
FIG. 11 is a side elevational view of the furniture interconnection system with the tenon inserted within the peak in the mortise and a key pin moving into a groove.

FIG. 11 shows a further embodiment of the system, using a locking system 100 having a key pin 102 and a groove 104. The post 60, having a pair of side edges, the side edge 62 having the mortise 70 and a second side edge 66 having the groove 104 opposing the opening 80 of the mortise 70 on the first side. The groove 104 and the key pin 102 are the same shape and approximately the same size, such that the key pin 102 fits snugly inside the groove 104. FIG. 11 shows the tenon almost fully rotated inside the mortise 50 into the final position, similar to FIG. 8 and the key pin 102 partially inserted into the groove 104.

The groove 104 is cut in to the second side edge 66, having a top side edge 66T and a bottom side edge 66B, the groove 104 forming approximately a forty-five degree angle with the bottom side edge and approximately a one hundred thirty-five degree angle with the top side edge 66T. The groove 104 has an opening 110, and a bottom, and is a parallelogram, having a pair of parallel sides, a first short side 104S and a second long side 104L, and a pair of sides 104E of equal length connecting the parallel sides. A first equal side 104E of the groove defines the opening 110; a second equal side 104E defines the bottom of the groove. The groove has a first pair of angles 106 of approximately forty-five degrees, connecting the long side 104L to the pair of equal sides 104E and a second pair of angles 108 of approximately one hundred thirty-five degrees, each supplementary to one of the angles in the first pair of angles 106, connecting the short side 104S to the pair of equal sides 104E. The groove 104 follows the pattern of having supplementary angles that are multiples of forty-five degrees. The key pin 102 is the same shape, with the same angles and the same approximate size as the groove 104. The angles of the key pin 102 have the same supplementary relationship as the angles of the groove.

The groove 104 has a depth such that the end 104, which is one of the equal side edges of the groove opposite the opening of the groove 110, penetrates into the mortise 70 on the opposing side 62 of the post 60. The groove 104 connects to the rear 72 of the mortise 70 creating an additional opening in the rear 72 of the mortise 70 and continues through the bottom 74B of the mortise 70 creating a passageway 112, cutting off an isosceles triangle 98 from the mortise 70 with the right angle of the lower square portion 74 forming one of the angles of the triangle 98.

Figure 12:
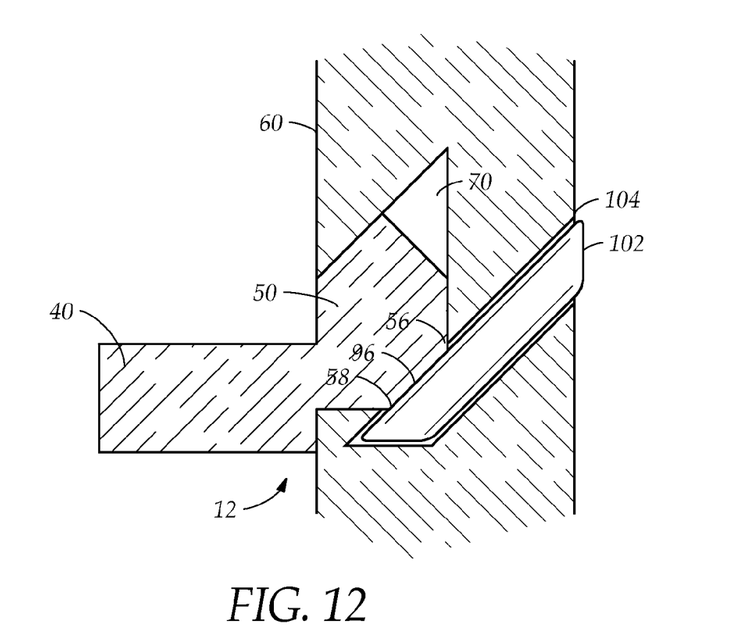
FIG. 12 is a side elevational view of the furniture interconnection system with the tenon fully inserted in the mortise and secured by the key pin inserted in the groove.

FIG. 12 shows the tenon 50 fully inserted in the mortise 70, similar to FIG. 9, locked into the final position by the key pin 102 fully inserted into the groove 104. The tenon 50 is in the final position, with the rail 40 at right angles to the post 60, the tenon 50 not capable of rotating further in the counterclockwise direction. The key pin 102 moves into the passageway 112 in the mortise 70 created by the groove 104, blocking clockwise rotations of the tenon 50 by abutting side three 96. Angle three 56 and angle four 58, adjacent to side three 96, cannot pivot because the key pin 104 is occupying the space for pivoting. The tenon 50 now cannot move in a clockwise direction if angle three 56 and angle four 58 cannot pivot to reverse the process of inserting the tenon 50. However, the joint 12 formed between the mortise 70 and tenon 50 locked in place by the key pin 102 is not permanent and can be dismantled by removing the key pin 102 from the groove 104 and rotating the tenon 50 clockwise in a manner reversing the insertion method.

Figure 13:
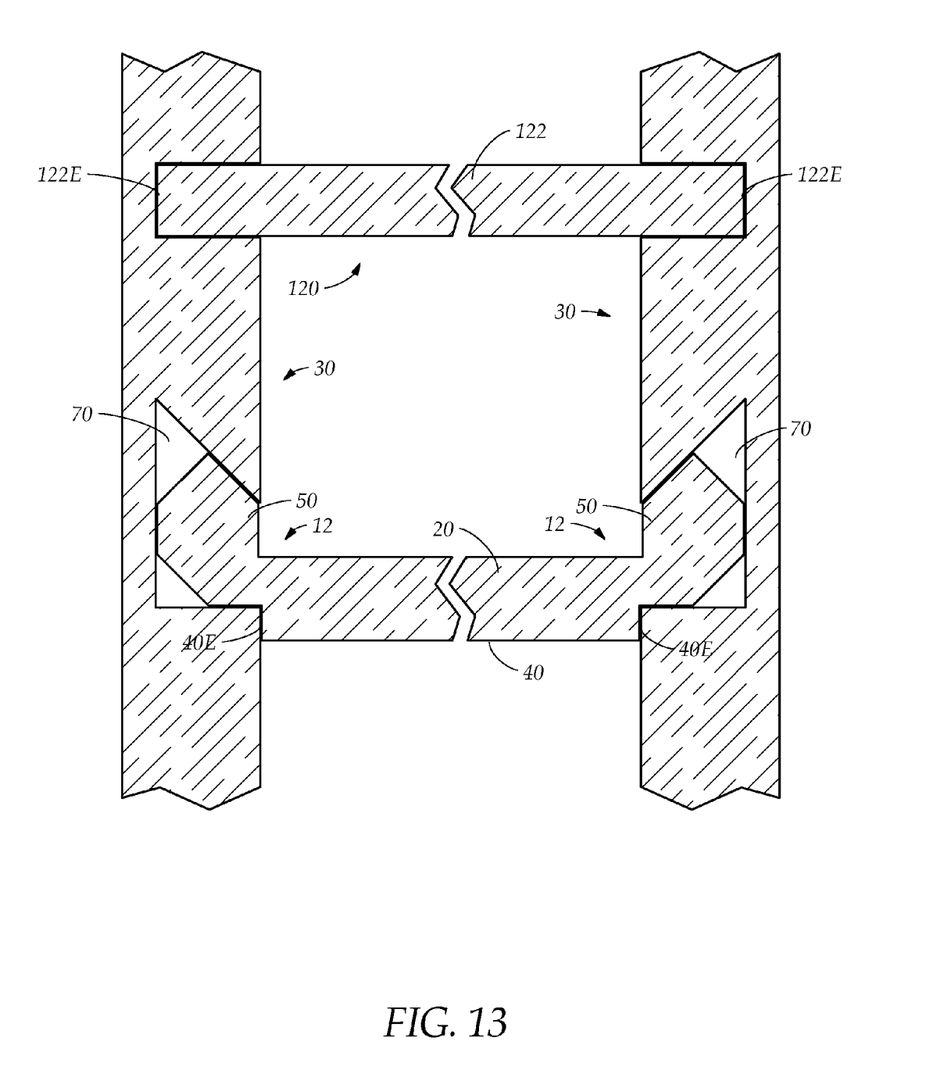
FIG. 13 is side elevational view of the furniture interconnection system with a board element between a pair of upright elements, forming a pair of joints and a horizontal element locking the joints in position.

In another embodiment, the joint 12 formed by the tenon and mortise is reversibly locked in place by a construction lock 120, which is illustrated in FIG. 13. The construction lock 120 is used when there is a pair of upright elements 30 joined by an additional horizontal element 122 in parallel to the board element 20. The board element 20, having the tenon 50 at each end 40E of the rail 40, joins the pair of upright elements 30, a first tenon 50 joined to a mortise 70 in a first upright element 30 and a second tenon 50 joined to a mortise 70 in a second upright element 30. The horizontal element 122, having a pair of ends 122E connects to the pair of upright elements 30, a first end to the first upright element 30 and a second end 122E to the second upright element 30. Once the horizontal element 122 of the construction lock 120 is connected, the horizontal element 122 prevents the upright elements 30 from rotating in a counterclockwise direction, which is the reverse of the insertion direction of the tenon 50. Generally, when the tenon 50 is inserted and pivoted, the upright element 30 remains stationary and the board element 20 rotates in a counterclockwise direction, pivoting the tenon 50 in the mortise 70. Rotating the upright element 30 in a clockwise direction while holding the board element 20 stationary achieves the same result. Inhibiting the movement of a first upright element 30 by joining the horizontal element 122 to the first upright element 30 and the second upright element 30 eliminates freedom of movement of the board element 20, forcing the board element 20 to remain stationary between the pair of upright elements 30.

FIG. 9 demonstrates how to use the furniture interconnection system 10 when assembling a furniture frame having a joint 12 formed by the tenon 50 having an irregular hexagon shape and the mortise 70 having an irregular quadrilateral shape. The board element 20 with the tenon 50 is initially rotated ninety degrees clockwise from a horizontal position to a substantially vertical position, parallel to the upright element 30. The tenon 50 is inserted. The tenon 50 is pivoted a first time counterclockwise, about forty-five degrees on angle three 56 of the irregular hexagon and a second time counterclockwise, about forty-five degrees on angle four 58 of the irregular hexagon, until the board element 20 returns to the original position. To dismantle the joint 12, the steps are reversed. The tenon 50 is pivoted a first time clockwise, about forty-five degrees on angle four 58 of the irregular hexagon and a second time clockwise, about forty-five degrees on angle three 56 of the irregular hexagon. The board element 20 rotates about ninety degrees counterclockwise from the horizontal position to the vertical position. When the board element 20 is almost vertical, the tenon 50 is withdrawn completely from the mortise 70, dismantling the joint 12.

In the further embodiment, the post have the locking system, as illustrated in FIG. 12, the tenon 50 is positioned as described hereinabove to form the joint 12. The key pin 102 is inserted into the groove 104, preventing the tenon 50 from rotating inside the mortise 70 so that the joint 12 cannot be dismantled. To dismantle the joint 12, the key pin 102 is removed from the joint 12 by pulling the key pin 102 out of the groove 104. The joint 12 is further dismantled as described hereinabove In another embodiment, as illustrated in FIG. 13, the furniture interconnection system having the construction lock, the pair of tenons 50, one on each end 40E of the rail 40, are positioned as described hereinabove to form the pair of joints 12, the first joint 12 on the first upright element 30 and the second joint 12 on the second upright element 30. The construction lock 120 is placed between the pair of upright elements 30 by slightly tilting the upright 30 elements slightly away from one another and connecting the horizontal element 122 to the pair of upright elements 30, connecting the ends of the horizontal element 122E, the first end 122E to the first upright element 30 and the second end 122E to the second upright element 30. To dismantle the joints 12, the horizontal element 120 is removed from between the pair of upright elements 30. The joint 12 is dismantled as described hereinabove. It is understood by those of ordinary skill that the construction lock and the locking system employing the key pin and groove can be combined in a yet another embodiment.

In conclusion, herein is presented a system for interconnecting structural members, namely interconnecting a first furniture frame element perpendicular to a second furniture frame element with an interlocking joint formed by a substantially hexagonal tenon that inserts into an irregular quadrilateral mortise and pivots into a locked position. The invention is illustrated by example in the drawing figures, and throughout the written description. It should be understood that numerous variations are possible, while adhering to the inventive concept. Such variations are contemplated as being a part of the present invention.

What is claimed is:

1. An interlocking joint in a furniture interconnection system for reversibly connecting a furniture frame board element having at least one end perpendicularly to a furniture frame upright element, comprising:

an irregular quadrilateral mortise, the mortise a cavity cut into the upright element, wherein the mortise has a top portion and a bottom portion that form one continuous cavity including a front opening at the bottom portion, the bottom portion having a square shape that includes the front opening and abuts the top portion such that the top portion forms an isosceles right triangle shape with the bottom portion; and an irregular substantially hexagonal tenon on the end of the board element, the tenon has a top right angle, and four angles each of approximately one hundred thirty-five degrees, the tenon for inserting into the mortise with the board element substantially parallel to the upright frame element and pivoting inside the mortise until the board element is perpendicular to the upright frame element, forming a reversible interlocking joint for connecting the board element to the frame element;

wherein, when the tenon is interlocked into the mortise, the tenon and the mortise define a pair of spaced apart gaps between the tenon and the mortise, each gap having the shape of a smaller isosceles right triangle.

2. The interlocking joint as described in claim 1, wherein the interlocking joint has a locking system, the locking system having a key pin and a groove, the groove cut into the upright element, the upright element having a pair of opposing sides, a first side having the opening of the mortise and a second side having an opening for the groove, the groove cut into the upright element opposite the mortise and extending through the rear of the mortise into the bottom portion of the mortise and through the bottom of the mortise, the key pin inserting into the groove and extending into the mortise when the joint is formed, preventing the tenon from pivoting inside the mortise and dismantling the joint.

3. The interlocking joint as described in claim 2, wherein the groove has an opening, a bottom, and parallelogram shape, the parallelogram shape having a pair of parallel sides, a first short side, a second parallel long side, and a pair of equal sides of equal length connecting the parallel sides, a first equal side defining the opening of the groove and a second equal side defining the bottom of the groove, the groove having a first pair of angles connecting the short side to each of the equal sides, the pair of angles each equaling approximately one hundred thirty-five degrees, the key pin having a second pair of angles connecting the long side to each of the equal sides, the pair of angles each equaling approximately forty-five degrees.

4. The interlocking joint as described in claim 2, wherein the key pin has a parallelogram shape, the parallelogram shape having a pair of parallel sides, a first short side, a second parallel long side, and a pair of equal sides of equal length connecting the parallel sides, the key pin having a first pair of angles connecting the short side to each of the equal sides, the pair of angles each equaling approximately one hundred thirty-five degrees, the key pin having a second pair of angles connecting the long side to each of the equal sides, the pair of angles each equaling approximately forty-five degrees.

5. The interlocking joint as described in claim 4, wherein the key and the groove have a plurality of angles, each angle having an integer multiple of forty-five degrees, such that the plurality of angles form a plurality of pairs that are supplementary when the key pin is inserted into the groove extending into the mortise and locking the tenon in place.

6. The interlocking joint as described in claim 1, wherein the board element has a pair of ends, each end having a tenon, the board element connecting to a pair of upright elements, each having the mortise, each tenon and mortise forming an interlocking joint connecting the board element perpendicularly to the pair of upright elements, and a construction lock having a horizontal element having a pair of ends further connecting the pair of upright elements, an end of the horizontal element connected to each upright element, further preventing rotating the upright elements to dismantle the joint.

7. An interlocking joint in a furniture interconnection system for reversibly connecting a furniture frame board element having an end, perpendicularly to a furniture frame upright element, comprising:

an irregular quadrilateral mortise, the mortise a cavity cut into the upright element, the mortise having a top portion and a bottom portion, the top portion and bottom portion forming one continuous cavity, the top portion having a top, the bottom cavity including a front opening, the bottom portion having a square shape and the top portion having an isosceles right triangle shape having a pair of acute angles of approximately forty-five degrees one of said acute angles at the top of the mortise; and an irregular substantially hexagonal tenon on the end of the board element, the tenon having a top and a bottom, four angles, each approximately one hundred thirty-five degrees, and a top right angle, the tenon for inserting into the mortise with the board element substantially parallel to the upright element and pivoting inside the mortise until the board element is perpendicular to the upright frame element, forming a reversible interlocking joint connecting the board element to the frame element wherein, when the tenon is interlocked into the mortise, the tenon and the mortise define a pair of spaced apart gaps between the tenon and the mortise, each gap having the shape of a smaller isosceles right triangle.

\* \* \* \* \*